MARGINAL CHECKING APPARATUS

Filed Dec. 18, 1961 3 Sheets-Sheet 1

INVENTOR
JOHN C. JONES

BY K. W. Johnson
ATTORNEY

Dec. 21, 1965 J. C. JONES 3,225,176

MARGINAL CHECKING APPARATUS

Filed Dec. 18, 1961 3 Sheets-Sheet 2

United States Patent Office 3,225,176
Patented Dec. 21, 1965

3,225,176

MARGINAL CHECKING APPARATUS

John C. Jones, Apalachin, N.Y., assignor to International Business Machines Corporation, New York, N.Y., a corporation of New York Filed Dec. 18, 1961, Ser. No. 159,980
16 Claims. (Cl. 235—61.7)

This invention relates generally to devices for sensing data manifestations recorded on record members, and more particularly to apparatus for detecting those devices of marginal capability and reliability.

The present invention is concerned with that area of data processing known as data reading or sensing. At some stage in the processing of information by machines, the data to be processed will have been recorded on record members for temporary or permanent storage. These recorded data are often represented by coded manifestations in the form of punched or printed marks on a record member which is passed through a sensing station. A sensing station includes a plurality of individual sensing devices each scanning a designated area of the record members and translating any coded manifestations encountered into electrical output signals.

As a result of continuing efforts to increase record sensing speed, photocells are being used as the transducers in sensing devices. A plurality of cells is generally arranged as a row and a record member bearing data indicia is passed transversely of the row in scanning relation with the cells so that each indicium varies the quantity of light from a source that reaches a particular cell. Each cell provides an electrical output signal in accordance with the quantity of light falling upon it, and may provide voltage levels as signals indicative of the presence or absence of a data indicium at any instant of time.

Each photocell is generally composed of a junction of P and N types of semiconductor material so connected to control the conduction of a transistor and produce an amplified signal level representative of the quantity of light striking the cell junction. Each cell and its transistor are connected through various electrical components to circuits having designated circuit parameters of voltage and current so as to provide distinctive output signal levels indicating either a small or large quantity of light on the cell junction. Hence, an appropriately placed data indicium can markedly alter the normal quantity of light striking the junction.

The combination of photocells and transistors are especially desirable as high speed record sensing devices because of their compact size, small current requirements and quick response to changes in light intensity. Light is also an easily varied form of energy.

Although semiconductor circuits are highly desirable as record sensing devices, there are several disadvantages encountered in their use. Photocells produce only small electric currents and some are subject to internal changes of current generating capacity and increasing leakage current with use, eventually causing erroneous output signals to the connected transistor. Similarly, transistor characteristics of leakage current and base-collector current amplification may also change in a portion of these transistors to produce false output signals. Furthermore, when such devices are used in a light-responsive application, the light source nearly always dims with age and eventually fails to produce sufficient light for reliable sensing operation even with extremely stable cells and transistors. In addition, circuit malfunction may occur only intermittently under normal circuit conditions, making detection difficult.

Thus, when cells and transistors are coupled together as light-responsive sensing devices in record sensing applications, their over-all stability is sufficiently poor that some sort of periodic operating check is required. Sensing reliability may be improved by frequent operational inspections by a technician or by providing a duplicate sensing station or by replacement of the sensing devices and light source prematurely, prior to failure.

Each of these checking methods is too costly for commercial applications. The first method involves the added and often unnecessary service time of a technician; the second method requires nearly double the original equipment cost and doubles the number of cell-transistor circuits which can fail; and the third method results in discarding many circuits long before the end of useful life. Therefore, a more acceptable checking device is necessary.

Accordingly, it is a primary object of the present invention to provide inexpensive apparatus for performing a regular and reliable operational check of record sensing devices.

Another object of this invention is to provide apparatus for detecting marginal performance capabilities of record sensing devices.

Another object of this invention is to provide apparatus for detecting marginal operating capabilities of each of a plurality of record sensing devices at least once for every record member passing in sensing relation with those devices.

Yet another object of this invention is to provide cyclically operable apparatus for detecting marginal performance of any of a plurality of sensing circuits which is compatible with the regular operating circuits.

A further object of this invention is to provide apparatus for cyclically checking record sensing devices in different predetermined relations to the passage of a record member.

A still further object of this invention is to provide apparatus for cyclically changing the voltage applied to data sensing circuit components under simulated sensing conditions to induce those components of limited or excessive electrical impedance to produce false output signals from their respective sensing circuits.

Still other objects of this invention are: to provide apparatus for detecting sensing circuits of marginal performance capability under simulated conditions of both the presence and absence of data indicia; to provide apparatus for subjecting record sensing devices to varying circuit parameters to induce failure of those devices which are of marginal performance capability; to provide apparatus for detecting and indicating the presence of a sensing device in a plurality of sensing devices which has marginal operating ability; and to provide apparatus controlled by the progress of a record member toward a sensing station for detecting sensing devices at the station which are of marginal capability.

The foregoing and other objects of the invention are accomplished by utilizing transport means for moving record members successively toward a sensing station, having a plurality of record sensing circuits, in a manner to subject each of the sensing circuits to the simulated presence or absence of data manifestations as each member arrives thereat. Activating means are synchronized with the transport means for activating circuit modifying means which alter the normal circuit parameters of the sensing circuits to induce false output signals from those sensing circuits of marginal performance capability while subjected to the simulated conditions. During the simulated sensing, detection means, controlled by the activating means, scan the output signals of the sensing circuits and upon detection of a false signal initiate operation of an indicating means.

The apparatus of this invention is also able to detect abnormal conditions of record members having unusual light transmitting or reflecting characteristics and malfunction of the transport means that results in early or late arrival of record members at the sensing station. This detection occurs because false output signals from a sensing circuit will appear during the simulation of either the presence or absence of data manifestations.

The invention utilizes must of the circuitry employed in normal data sensing operations. Thus, the circuits other than the sensing circuits are advantageously subjected to periodic checking, resulting in an added improvement of machine reliability.

The foregoing and other objects, features and advantages of the invention will be apparent from the following more particular description of a preferred embodiment of the invention, as illustrated in the accompanying drawings.

Before proceeding with the description of a preferred embodiment of the invention, the documents contemplated for use in conjunction with the invention will be briefly described. These documents or record members are cards which have been punched in selective ones of a plurality of possible data positions to represent data in some coded form. One of the more common types of cards is that having 960 possible data positions arranged in rows and columns within a designated area of the card. The cards usually comprise 12 longitudinal rows of 80 data positions each of 80 columns transversely of the card. A margin void of data positions is left along the card edges. Numerical or alphabetical data is represented by punching one or more holes in designated positions within a column and the value assigned to each hole location within a column is determined as the card progresses in timed relationship through a sensing station. It is to be understood that the foregoing type of card is used merely for illustration purposes and that the invention is equally adapted to documents having other configurations and coding.

Figures 1, 2, 5:
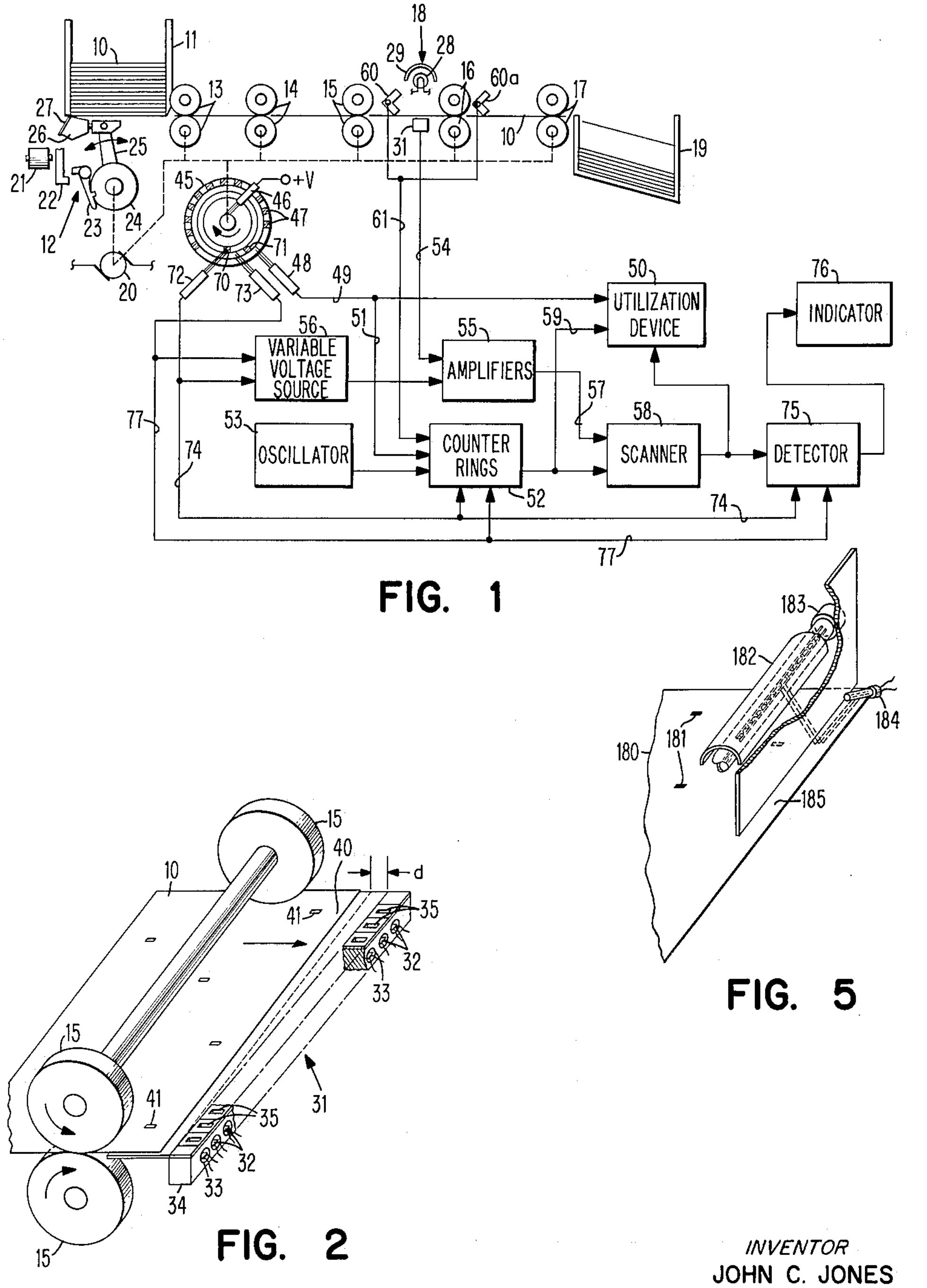
FIG. 1 is a combined block diagram and schematic representation of the marginal checking apparatus of the present invention.
FIG. 2 is a perspective view of the record sensing station shown in FIG. 1.
FIG. 5 is a partial perspective view of a modification of the sensing station of FIG. 2 with which the invention may be used.

Referring now to FIG. 1 there is schematically illustrated a document processing apparatus with which the invention may be used. Documents 10 are placed in a supply hopper 11, fed therefrom by a picker mechanism 12, transported along a designated path by pairs of feed rolls 13, 14, 15, passed through a sensing station 18, and carried by feed roll pairs 16 and 17 to a stacker 19 where they are deposited. Document picker mechanism 12 and feed rolls 13–17 may be driven through any suitable shaft, worm and gear arrangement, indicated as a broken line, by motor 20.

Document feeding from stacker 11 is controlled through the selective operation of picker knife mechanism 12. In this mechanism, the energization of an electromagnet 21 by any suitable means attracts armature 22 which releases spring loaded pawl 23 to enable it, in turn, to engage a one-tooth ratchet 24 which is continuously driven by motor 20. Pawl 23 is attached to a sleeve and cam (not shown) which upon rotation with ratchet 24 causes picker arm 25 to oscillate back and forth in the direction of the arrow. Attached to arm 25 is a block 26 having fixed thereto a picker knife 27 which engages a single document 10 in stacker 11 and slides the engaged document into contact with constantly turning feed rolls 13. Succeeding feed rolls are spaced from each other so that the document fed by picker knife 27 is carried from one set of feed rolls to another and is passed through sensing station 18. Upon emerging from sensing station 18, it is picked up by succeeding rolls 16 and 17 and carried to stacker 19. As long as electromagnet 21 remains energized, picker arm 25 will continue to cyclically oscillate with each revolution of ratchet 24 and picker knife 27 will continue feeding one card at a time from the supply hopper 11. The action of the arm is so fixed that successive cards are fed to the feed rolls at regularly spaced intervals.

Cards 10 are sensed photoelectrically upon reaching sensing station 18. The sensing station includes an elongated light source 28 and a reflector 29 coextensive with the light source. The light source and reflector extend transversely of the card path, as shown in FIGS. 1 and 2, and are both coextensive with the length of card 10. The directed light from source 28 and reflector 29 illuminate the upper surface of the card. Below the card path, there is disposed a bank of photocells indicated generally as 31, each of which is activated when subjected to a portion of the concentrated beam of light from source 28. Thus, for the parallel sensing of data columns in card 10, one cell is required for each column or a bank of 80 cells is necessary.

The arrangement of the bank of cells is shown more clearly in FIG. 2. Photocells 32 are mounted in individual holes 33 transversely drilled in an opaque bar 34. Above each cell in bar 34 and communicating with horizontal holes 33 are located additional vertical holes 35 through which light is directed from source 28 and lens 30 to each individual cell.

Each cell 32 comprises a junction of P and N type semiconductor material which produces upon the incidence of light thereon an increased number of carriers (holes and electrons) causing a voltage potential to be generated across the junction. This increased potential is used to control an amplifier so that when the cell is exposed to the light either by the absence of a card or by a hole present in the card, a particular cell, arranged to scan the designated column on card 10, will indicate its illuminated condition. When no light reaches the cell junction, only slight leakage current flows through the cell and negligible voltage potential is generated across the cell. It can be seen in FIGS. 1 and 2 that as feed rolls 15 move the card in the direction of the arrow between light source 28 and cell bank 31, all cells are first exposed to light and then all cells are covered by the card margin 40 in which no holes will appear. Upon further movement of the card, predetermined ones of the cells will be exposed to light through punched holes 41 in the first row of data positions encountered in card 10. Continued movement of the card over the cells and below source 28 will intermittently expose those cells corresponding to the card columns which contain perforations. Therefore, if each cell in the bank of photocells is sampled in timed relation with each possible row of data positions arriving in alignment with the cells, the punched information contained in the card can be transformed into electrical inpulses having assigned values which are capable of use with other data processing machines.

Regular sampling of all cells in the cell bank with the arrival of each longitudinal row of data positions is accomplished (FIG. 1) with an emitter 45. The emitter may be mechanically coupled, for instance, to feed rolls 14 to make a single revolution for each card 10 fed from hopper 11. The emitter rotation is synchronized with the progression of each card through station 18. A common brush 46, supplied with voltage, energizes each segment 47 and as the emitter rotates, each segment successively energizes brush 48 and line 49 for a predetermined time at predetermined intervals. Each energized interval coincides with the arrival of a longitudinal row of possible data positions on card 10 at sensing station 18.

While a brush type emitter 45 is used as a source of timing pulses for the description of this invention, it is to be understood that other types of emitters such as capacitor, magnetic or photocell emitters may be employed. These latter emitters are well known and are especially desirable when high speeds are required which cause brush bounce in the brush type illustrated.

The energization of line 49 conditions utilization device 50, which may be a data storage device, for the receipt of data signals from cells 32. Line 51, also simultaneously energized by brush 48, conditions counter rings 52 to be stepped through their stages by pulses from oscillator 53. The counter rings provide 80 successive pulses during each cycle and are used to read out the signal levels from the cells. The cells 32 are each connected by a plurality of lines, generally designated 54, to a respective one of a plurality of transistor sensing amplifiers 55 supplied with voltage from variable voltage source 56.

The amplified outputs of the cells are supplied along individual lines 57 to a scanner 58 where each cell amplifier output is conditioned in sequence by ring pulses from rings 52 for passing the cell outputs to utilization device 50. The latter device may also be simultaneously conditioned for receiving columnar data by the same pulses from counter rings 52 on line 59.

To insure that cards are present in the proximity of station 18 for sensing, two parallel-connected card levers 60 and 60*a* are provided either side of the sensing station. These card levers are spaced from each other less than a card width and each consists of a pivoted lever actuated by the moving cards to close a pair of normally open contact points. The closed contacts supply a potential on line 61 to also condition counter rings 52 for operation. When misfeeding of cards occurs or all cards have been fed, the contacts are permitted to open disabling further operation of counter rings 52 and blocking the operation of scanner 58. Although pivoted levers have been illustrated as card levers, they may be replaced by one or more photocell arrangements controlled by the presence of a card near the sensing station which serve the same function.

From the foregoing it is seen that as cards 10 proceed through sensing station 18, various ones in the bank of 80 photo-responsive cells may be activated by light through card perforations from source 28 and produce output signals. All cells are then sequentially sensed in timed relation with the arrival of each of 12 rows of data positions and those output signals are transmitted to utilization device 50. In this manner coded information from the cards is translated into timed electrical signals acceptable for subsequent processing.

Since each of the 80 cells is sensed in succession while card 10 is continuously moving through the sensing station, it is desirable to displace the column 80 end of the light source and cell bank to the right in FIG. 2 by a distance "*d*." This displacement insures that each cell will be exposed to the maximum light when scanned for an output signal if a hole is present. The amount of displacement "*d*" depends on the card speed and the time necessary to scan the bank of cells.

Up to this point the assumption has been made that each photocell, its transistor amplifier, and associated components and circuits operate properly. Practically, however, failures occur which may be due to faulty cells, transistors, light source or to misfeeding of the cards. Failures in the remaining circuits also occur but less frequently. It is thus necessary that the reliability of the sensing operation be maintained and that some check be made to anticipate and detect as many of the likely sources of failure as possible before errors are produced.

Therefore, a checking circuit is provided to regularly modify the normal operating parameters for each sensing circuit to induce failure of those components that are of marginal capability. The cell and transistor of each sensing circuit are cyclically subjected to voltage and current conditions above and below those used in the normal sensing operation. If, under either of these conditions, a false output signal is produced, a sensing circuit is considered to be of marginal reliability and further document sensing should be discontinued.

It will be recalled from the description of FIG. 2 that all cells 32 are exposed to light from source 28 immediately before each card arrives at sensing station 18 and that all cells are subsequently covered by the blank margin of the card as the card continues into the sensing station. Therefore, each of the 80 cell-amplifier sensing circuits is scanned under these simulated sensing conditions of exposure and nonexposure to determine that each circuit produces the appropriate output signal indicative of the quantity of light striking the cell. Any sensing circuit not producing the proper output signal is in error and a malfunction is indicated. Furthermore, a circuit may produce intermittent errors or may be closely approaching failure and the modification of circuit parameters aids early detection.

Marginal checking of the sensing circuits is accomplished by using much of the original circuitry and apparatus necessary for normal data sensing. Referring to FIG. 1 it is seen that emitter 45 is provided with two additional energized segments 70, 71 in separate tracks on the emitter. These segments cyclically come into contact with their respective brushes 72 and 73. The brushes and their emitter segments are so located that, as the emitter rotates, brush 72 is briefly energized immediately before card 10 covers cell bank 31, and brush 73 is briefly energized after brush 72 is de-energized and a blank card margin 40 covers all cells 32 (FIG. 2). Brush 48 is energized after brush 73 is de-energized.

The emitter signal on brush 72 energizes line 74 so that the signal appears at variable voltage source 56, counter rings 52 and detector 75. Upon receipt of the signal at source 56, its normal supply voltage to the cells and amplifiers 55 is increased a predetermined amount. The amount of the increase is a fraction of the normal supply voltage and, while exposed, the cells and their amplifiers should be capable of maintaining proper performance with the increased current flow. However, if a cell-amplifier circuit is of marginal capability, an erroneous output signal will result.

The signal appearing at counter rings 52 conditions the rings for advancement by oscillator 53. As the output from each cell-amplifier circuit appears at scanner 58 it is successively conditioned for sampling by detector 75 already activated by the signal on line 74. Any improper or erroneous signals detected will actuate indicator 76.

Similarly, when brush 73 is later energized, a signal appears on line 77 and at voltage source 56, counter rings 52 and detector 75. At this time, card margin 40 covers all cells 32 and the signal at voltage source 56 produces a supply voltage for the cells' amplifiers which is a predetermined amount below the normal supply voltage. Again, as counter rings 52 are conditioned for operation, they serially permit scanning each cell-amplifier output at scanner 58. Each scanned output then appears at detector 75, previously actuated by the pulse on line 77. Again, an erroneous or improper output signal will operate indicator 76. Under the operating condition of subnormal voltage and with all cells covered, cell-amplifier circuits should all produce signals indicating the absence of a hole in the card. However, those of marginal ability will produce erroneous signals falsely indicating that a hole is present. Each cell-amplifier sensing circuit is thus cyclically tested before any data is taken from a record card presented at the sensing station.

Figure 3:
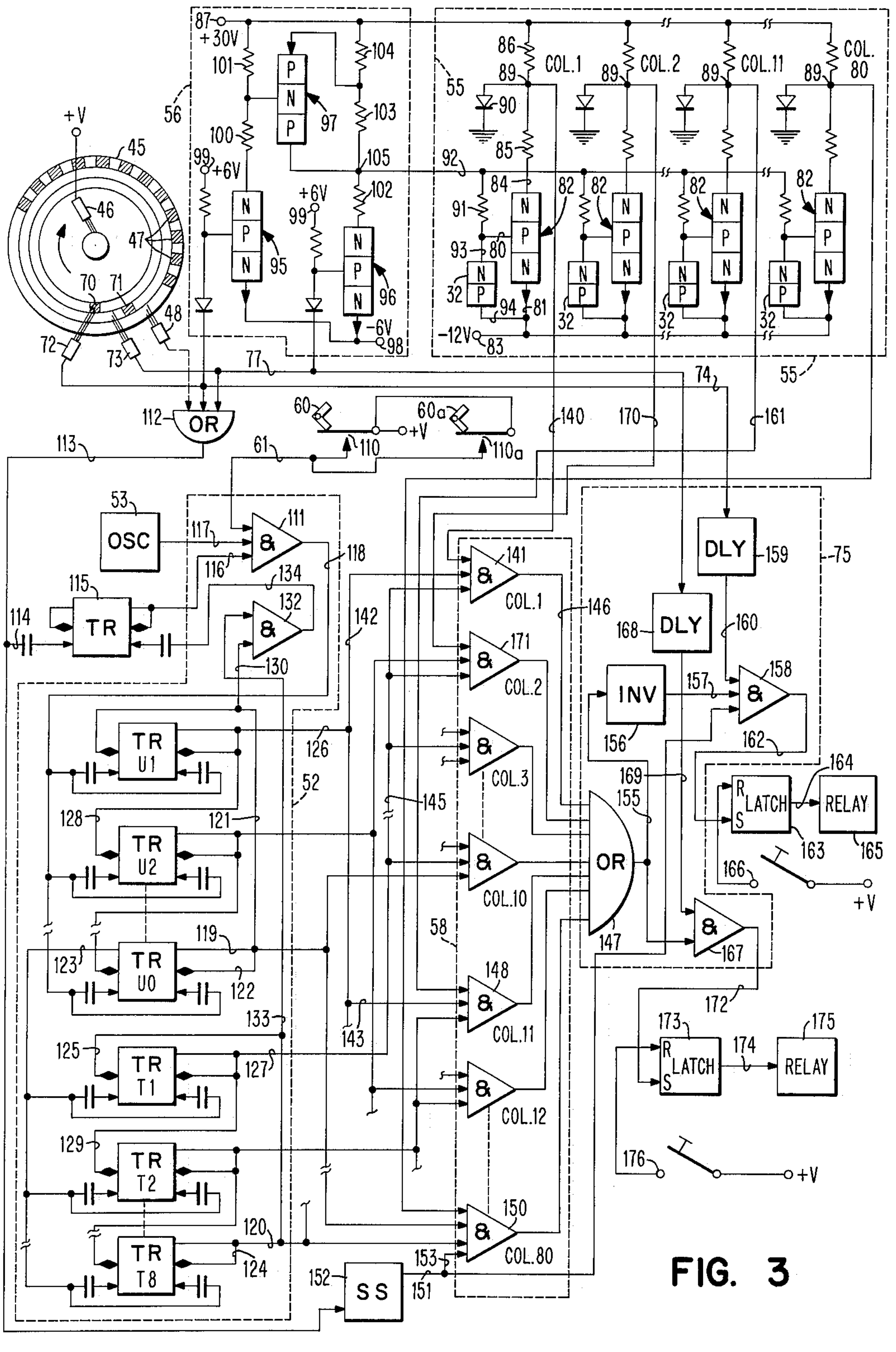
FIG. 3 is a combined electrical schematic diagram and detailed block diagram of the marginal checking circuit.
Figure 4:
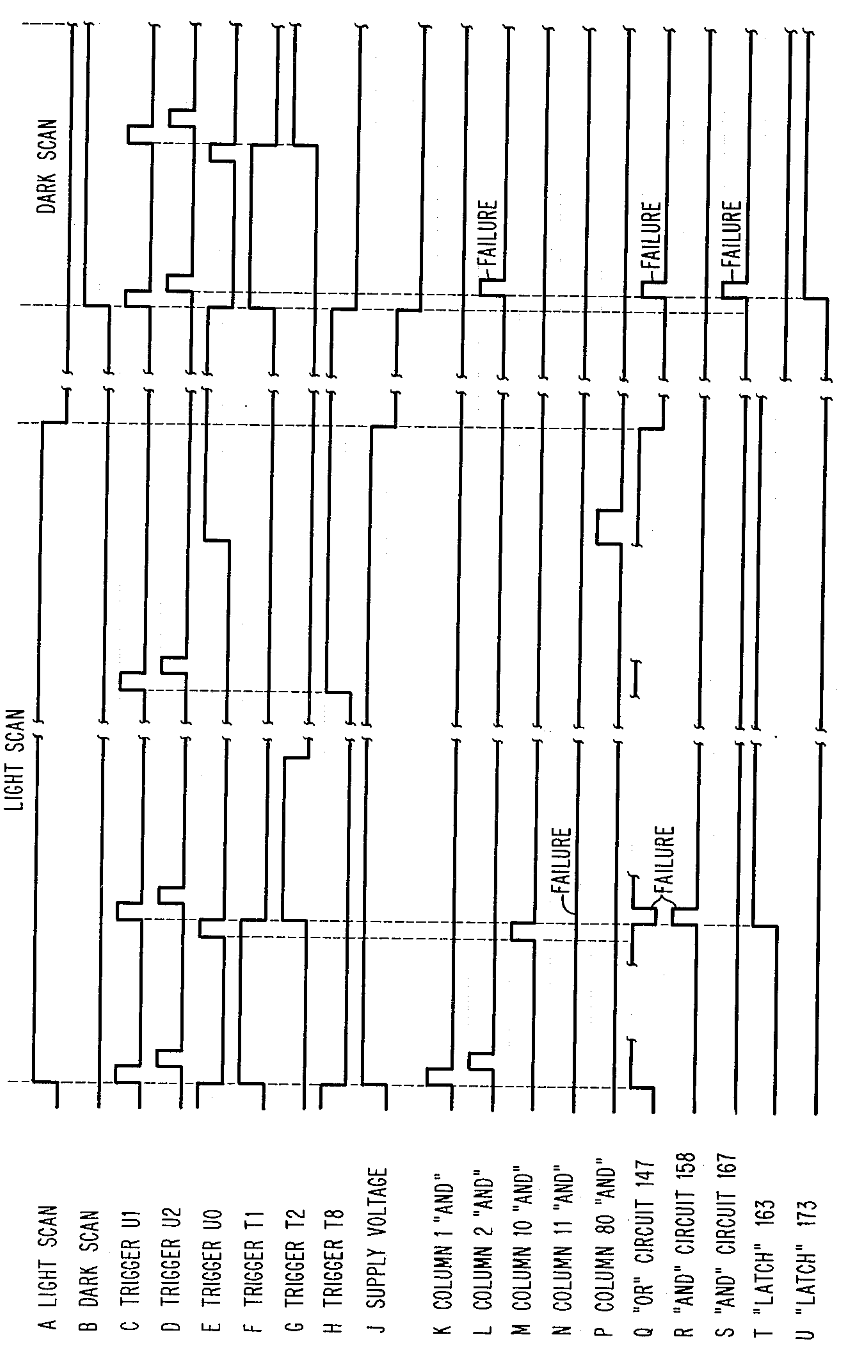
FIG. 4 is a timing diagram of the circuit shown in FIG. 3.

A more detailed description of the marginal checking circuit is given in conjunction with FIG. 3 which shows a schematic diagram of the checking circuit, and with FIG. 4 which shows a timing diagram for the checking circuit. In the circuits to be described, electrical signals may assume one of two voltage levels, each of which represents the presence of certain predetermined conditions according to techniques well-known in the art. These signal levels are identified as "positive" and "negative" to differentiate between them and these terms merely identify the signal voltages relative to each other, irrespective of their relationship to some arbitrarily selected "ground" potential.

In the circuit diagram, certain elements are shown symbolically for the sake of simplicity and clarity of the drawing. The circuits represented by these symbols are all well-known in the art and will be described only briefly to review their function.

The symbol "TR" represents a conventional bistable trigger having an off condition when the left side is conducting and an on condition when the right side of the trigger is conducting. The inputs and outputs of the trigger are at the left and the right sides of the block with the inputs near the bottom of the block and the outputs near the top. In order to switch the trigger from one stable state to another, two positive inputs on the same side of the block are required. One of these inputs is a positive gating level and the second is a positive going pulse. When these inputs occur together, the diagonally opposite output signal level will be positive and the output on the same side as the two inputs will be negative. Thus, two positive inputs on the right side of the trigger will turn it off with the right output negative and the two positive inputs at the left side will turn it on with the left output negative.

A symbol "&" represents a coincidence AND circuit in which all inputs to the circuit must be in a predetermined like condition before an output signal is provided. In the marginal checking circuit all inputs must be positive before a positive output signal is produced. For example, the right output of an ON trigger will provide a conditioning signal to the AND circuit, while the left side would block the circuit.

The symbol "OR" represents a conventional OR circuit in which an input signal on any of the input lines will cause an output signal of the same polarity to be provided. Thus, in a two input OR circuit a positive input signal and a negative input signal will provide a positive output signal.

The symbol "INV" represents a conventional inverter circuit in which an input signal of one polarity to the left side of the block produces an output signal of the opposite polarity on the right side of the block. Hence, a positive input will produce a negative output.

The symbol "OSC" represents any well-known oscillator which continuously produces output pulses at a constant frequency.

The symbol "DLY" represents a device for delaying the transmission of a change in signal level for a predetermined time between its arrival at the input and appearance at the output terminal.

The symbol "LATCH" represents a conventional circuit which is switched from an off state to an on state by a set pulse applied to one input S thereof and provides a continuing output when so set. The latch output persists in this state until reset by a pulse at the second input R thereof even though the set input pulse has been discontinued or applied successively during the interim.

The symbol "SS" represents a conventional single shot (monostable multivibrator) which upon being pulsed by a positive input at the lower left side thereof will go on to produce a positive output for a predetermined time interval at the upper right side thereof.

With reference to FIG. 3, most of the circuits indicated by blocks in FIG. 1 are schematically illustrated in FIG. 3 and broken lines with common reference numerals are used to indicate those portions of the circuits shown as blocks in FIG. 1.

The columnar sensing circuits are indicated as a group 55 in FIG. 3. Four columnar sensing circuits for columns 1, 2, 11 and 80 are shown and each includes a P-N junction photocell 32 connected in reverse biased fashion between the base 80 and emitter 81 of a transistor 82. Each emitter 81 is connected to a source of negative potential at terminal 83. Each collector electrode 84 is connected through resistors 85 and 86 to a source of positive potential at terminal 87. A junction 89 between resistors 85 and 86 is clamped to ground through forward biased diode 90. Each transistor base 80 is connected through a resistor 91 to a base potential supplied from variable voltage source 56 on line 92.

Normally, the potential on line 92 is approximately 6 volts. Assuming for the moment that line 92 is conditioned for normal sensing operations, the operation of a cell-amplifier sensing circuit will be described. Since each cell 32 is located to scan a particular column in card 10, it will intermittently be exposed to light from source 28 through a hole or between cards. The incidence of light upon the P-N junction of the cell produces an excess of carriers within the cell causing a voltage potential of a few tenths of a volt to be generated between electrodes 93 and 94. This action biases transistor base 80 negative with respect to emitter 81. The incidence of light on the cell reduces the internal impedance of the cell which provides an alternate path for current through resistor 91 which decreases the base current available and necessary for the conduction of transistor 82. When cell 32 is properly operating and exposed to light, the cell is conducting heavily and transistor 82 is switched to cut off. This action stops current flow except normal leakage current, through resistor 85 to collector electrode 84 so that junction 89 assumes ground potential because of forward biased diode 90. The potential level of ground is a signal that a hole in the card coincides with the cell.

When cell 32 is darkened by card 10, a potential across electrodes 93 and 94 is no longer generated and the cell's internal impedance immediately increases. This action makes base current available for transistor 82 and the voltage at base electrode 80 is again positive relative to emitter electrode 81 so that transistor 82 switches to resume conduction. When transistor 82 conducts, its collector current is supplied through resistors 85 and 86 causing junction 89 to assume a potential a few volts below ground. Thus, when cells 32 are covered the voltage level at junction 89 is significantly below the level of ground potential and serves as a signal to indicate that no hole is present in the card.

In practice, several causes of failure may be present in a sensing circuit which produce erroneous output signals at junction 89. These causes of failure include insufficient voltage generation or impedance change across the cell when exposed, high leakage current through the cell when dark, high leakage current through the transistor when cut off, and insufficient base-collector current current gain of the transistor when conducting. Other causes of erroneous output signals include a dim light source, too much light leakage through the card and early or late feeding of the card. Each of these causes, singly or combined, will also produce false output signals at the cell-amplifier junctions 89.

Therefore, the sensing circuits are tested under modified conditions before actual sensing occurs. During the time before actual card sensing, the base voltage on line 92 is increased above normal when cells 32 are exposed and is decreased below normal when the cells are covered. These predetermined voltage excursions are made through variable voltage source 56 which includes N-P-N transistors 95 and 96 and a P-N-P transistor 97. The N-P-N emitter electrodes are each connected to a source of negative potential at terminal 98. The base electrodes of transistors 95 and 96 are each connected through a base resistor to a source of positive potential at terminal 99 and through a forward-biased diode to lines 74 and 77, respectively. Lines 74 and 77 are energized successively through their respective brushes 72 and 73 and emitter segments 70 and 71 from brush 46 at a positive potential.

The collector electrode of transistor 95 is connected through resistors 100 and 101 to a source of positive potential at terminal 87. The collector electrode of transistor 96 is connected through resistors 102, 103 and 104 also to terminal 87. Transistor 97 provides a current path parallel to resistor 103 by having its emitter electrode connected at the junction of resistors 103 and 104, and its collector electrode at junction 105 between resistors 103 and 102. The base of transistor 97 is connected between resistors 100 and 101 in the collector circuit of transistor 95.

Normally the voltage on line 92, mentioned above, is 6 volts which results from the voltage drop across resistors 103 and 104 between line 92 and terminal 87. However, upon receipt of a positive pulse on line 74 or 77 from emitter 45, the voltage at junction 105 is either raised or lowered. This is done in relation to the approach of a card to the sensing station. During the "light scan" or the time when cells are exposed immediately before card 10 arrives at sensing station 18, brush 72 contacts emitter segment 70 which raises the potential on line 74 (see waveform A, FIG. 4) with the result that the base of transisor 95 will become positive relative to its emitter, forcing the transistor into conduction. This results in collector current through resistors 100 and 101. The voltage drop across resistor 101 makes the base electrode of transistor 97 negative with respect to its emitter so that transistor 97 is also forced into conduction. With the collector of transistor 97 connected to junction 105, resistor 103 is bypassed reducing the impedance from terminal 87 to line 92. This action raises the voltage supplied on line 92 to all base resistors 91 of the sensing circuits, as shown by waveform J in FIG. 4.

The amount of the voltage increase on line 92 is preferably that sufficient to increase the current through each photocell on the order of 25% while exposed to light from source 28. It will be recalled that while cells 32 are exposed, each amplifying transistor 82 should be cut off and if any one of cells 32 is unable to accommodate the slightly increased current, its transistor will be switched on by the rising base potential and increased current avaliable. Should one of the transistors 82 begin to conduct its output signal at junction 89 will therefore fall below its clamped ground potential and result in a signal indicating that no hole is present in the card. While the cells 32 are exposed to light, such an indication is an error. Although the cells of the sensing circuits are subjected to a current increase of 25%, the amount of the increase (or decrease) is discretionary and depends on the capability of properly operating circuits.

Consider now the opposite condition of a "dark scan" when all cells are covered by card margin 40 as the card continues its progress into the sensing station. At this time, brush 72 is no longer in contact with segment 70 but brush 73 comes into contact with segment 71 and is raised to a positive voltage level. This action will have cut off conduction in transistors 95 and 97 because the potential in line 74 has fallen. However, line 77 is raised to a positive level which raises the base potential of transistor 96 to cause conduction therein. This results in greater current flow through resistors 104 and 103 causing the potential at the junction 105 to fall well below the normal 6 volts, shown by waveform J. Resistor 102 is chosen so that when transistor 96 conducts the voltage on line 92 decreases sufficiently to cause an approximate 25% reduction in current through each base resistor 91 of transistors 82. If darkened cells 32 and transistors 82 are operating properly all transistors will be conducting so that the potential at junction 89 in the transistor collector circuits will be below the ground potential normally encountered to signify that the card contains no holes. However, should any cell 32 have an abnormally large amount of leakage current or should any transistor 82 have a low base-collector current gain, the decreased supply of base current on line 92 will be insufficient to permit the transistors to remain on and, therefore, the signal level at junction 89 will rise to very near ground potential. Such a signal, of course, falsely indicates that the cell sensed a hole in the card. Again, it is to be understood that the amount of current and voltage change is discretionary.

The manner in which occurrence of these false output signals from the cell-transistor circuits is detected will now be described. However, before proceeding with the description, an assumption will be made for the time being. All triggers in counter rings 52 are assumed to be in the off state except for triggers U0 and T8 which are in the on state so that output lines 119 and 120 from those respective triggers are positive. The validity of this assumption will become evident as the description proceeds.

As card 10 approaches sensing station 18 (FIG. 1), the card actuates card lever 60 to close contacts 110 applying one of three positive inputs to AND circuit 111 via line 61. Since emitter 45 is synchronously rotating with the moving card, it is timed so that emitter segment 70 contacts brush 72 before the card reaches cells 32. This results in a positive signal being applied on line 74 which passes through OR circuit 112 to line 113 and switches trigger 115 on via line 114, and also switches single shot 152 on. Trigger 115 produces a positive output from the right side thereof on line 116 to provide a second input to AND circuit 111. The third input to AND circuit 111 is applied on line 117 from constantly running oscillator 53 so that each positive pulse from the oscillator will produce a positive pulse on line 118 from AND circuit 111. These pulses on line 118 are used to advance counter rings 52 and will continue from oscillator 53 until eighty pulses have been supplied to completely cycle the counter rings. The eighty counter pulses on line 118 occur during the single pulse on line 74.

Counter rings 52 include a units ring having ten stages therein composed of triggers U1, U2 . . . U0. The second ring is a tens ring having eight stages therein composed of triggers T1, T2 . . . T8. (Each ring is only partially illustrated.) The two rings cooperate to produce a series of eighty enabling pulses for scannning each of the sensing circuits 1–80 and the scan of each circuit requires that a stage of the units ring and a stage of the tens ring be on simultaneously. A count 1–80 is performed by having one of the stages in the tens ring on and advancing the units ring through all its stages, then using pulse at the tenth units stage U0 to advance the tens ring to its next succeeding stage. This operation continues until each tens stage has been turned on and the units ring has advanced eight times through all of its stages.

Therefore, since trigger stages U0 and T8 are assumed to be on, their output lines 119 and 120, respectively, have positive signals thereon. The output signal on line 119 also appears on line 121 to condition the left or on side of trigger U1. Thus, with the appearance of a positive pulse on line 118 from oscillator 53, trigger U1 will be switched on by the pulse through the capacitor at the left side thereof (waveform C). Trigger U0 is switched off since its right side was conditioned for switching by the positive level from line 119 by line 122; the oscillator pulse on line 118 has no effect on the left side of trigger U0 since trigger is already on but the pulse also appears on the right side of the trigger and turns trigger U0 off (waveform E). As that trigger goes off, its left output line 123 goes positive and the signal appears at all ten triggers but switches only trigger T1 on and trigger T8 off. These two triggers were conditioned for switching by the positive output on the right side of trigger T8 on lines 120, 124 and 125. Thus, as trigger U0 is switched off by the first oscillator pulse on line 118, trigger T1 was switched on and trigger T8 was switched off as shown by waveforms H and F. The output line 126 from trigger U1 and line 127 from trigger T1 now becomes positive and appear as inputs to scanning circuit 58. These positive outputs also condition the originating triggers to be switched off and the next succeeding triggers U2 and T2, respectively, to be switched on. Thus, when trigger U1 is on, its output also appears on line 128 to condition trigger U1 to be switched off and trigger U2 to be switched on. When the next oscillator pulse appears on line 118, the switching action will occur as shown in waveform D. It can be seen that with succeeding oscillator pulses this advancing switching action will occur in all trigger stages intermediate triggers U2 and U0.

It is to be noted at this point that when trigger U2 was switched on, no stages in the tens ring were advanced. Such advancement comes only when trigger U0 is switched off to provide a positive pulse on line 123. This positive pulse is provided each time the units ring completes a counting sequence from 1–10. At that time, trigger T2 of the tens ring will be switched on and trigger T1 will be switched off since both have been conditioned for switching by the positive signal on line 127 and line 129 from on trigger T1 (waveforms G and F). By the time the units ring completes eight counting cycles, the tens ring will have advanced from trigger T1 through all intermediate stages to trigger T8. When triggers U0 and T8 are on simultaneously, lines 119, 121 and 130 will have a positive signal thereon from trigger U0 which appears at AND circuit 132 as one input thereto; a positive pulse will appear on lines 120 and 133 from trigger T8 as a second input to AND circuit 132. The AND circuit then produces a pulse on line 134 which turns trigger 115 off causing the trigger output signal on line 116 to go negative deconditioning AND circuit 111. This action blocks the appearance of any additional pulses on line 118 to advance counter rings 52. Thus, oscillator 53 has been properly gated to advance the units and tens rings to provide 80 unique combinations of pulses which are used to serially scan the output signals from each of the 80 sensing circuits at sensing station 18.

The scanning is accomplished by providing a three-input AND circuit in scanner 58 for each columnar sensing circuit at the sensing station except for column 80 which uses a four-input AND circuit. During the light scan all cells are exposed and each sensing circuit output is applied as one input to a corresponding AND circuit in the scanner. The remaining two inputs to each columnar AND circuit are respectively supplied from one of the triggers in the units ring of counter 52 and from one of the triggers in the tens ring. For example, to determine the output of the sensing circuit for column 1, the output at its junction 89 is applied over line 140 to AND circuit 141. The second input to AND circuit 141 is applied when trigger U1 is turned on and a positive signal appears over lines 126 and 142. The third input to AND circuit 141 is supplied from tens trigger T1 over lines 127 and 145. Thus, with the cell exposed in the column 1 position at sensing station 18, a positive or up signal will be present on line 140 so that AND circuit 141 is fully conditioned and a positive pulse will appear on line 146 to OR circuit 147.

It will be noted that the enabling pulse for trigger U1 on line 142 also appears at AND circuit 148 for column 11. This same pulse also appears at columns 21, 31, 41, 51, 61 and 71. Although the output for each sensing circuit is also simultaneously present as an input to its respective columnar AND circuit, the enabling pulse from the tens ring trigger T1 is present only for columns 1–10. This blocks all signals through those AND circuits other than column 1. The pulse from trigger T1 remains present at columns 1–10 until each units trigger has been switched on in succession. After column 10 is scanned, triggers U1 and T2 are turned on permitting scanning of column 11. As the units ring steps through trigger stages U1, U2, . . . U0, the AND circuits for columns 11–20 are successively scanned. In similar fashion each columnar AND circuit in scanner 58 is conditioned at a specific time providing a positive output to OR circuit 147 for each of the 80 card columns.

It will be recalled that when units trigger U0 and tens trigger T8 are switched on simultaneously, AND circuit 132 turns trigger 115 off to prevent further advance of the counter rings. At this time, AND circuit 150 for scanner column 80 would remain conditioned until the next scanning cycle for cells 32. However, in order to prevent an error from occurring as the card moves through the sensing station, a fourth conditioning input is provided for AND circuit 150. This input is the positive output signal from single shot 152 which was turned on at the start of columnar scanning by the positive pulse on line 113. Once turned on by the signal level of line 74 or 77, the single shot produces a positive output for a predetermined time, namely, that time necessary to permit scanning of the eighty columnar AND circuits by the counter rings 52. The single shot is used to accurately terminate the scanning operation rather than the emitter because of play in the mechanical elements, such as gears and worms, which necessitates making the emitter pulses of excessive length. After single shot 152 goes negative, AND circuit 150 is deconditioned to block further output. The output from the single shot also appears as a conditioning input at AND circuit 158 described below.

The remaining portion of the circuit will be described by considering a light scan when all cells are exposed, and a dark scan when all cells are covered. Examples of sensing circuit failures will also be considered.

Under the condition of a light scan, brush 72 contacts emitter segment 70 and line 74 goes positive for a predetermined time. The signal on line 74 causes variable voltage source 56 to provide an increase voltage on line 92 requiring each exposed cell 32 to conduct more heavily to maintain its transistor 82 off. If each cell and transistor performs properly, the input signal to each columnar AND circuit in scanner 58 will be positive. If a cell or its transistor does not perform as required, the corresponding columnar AND circuit will have a negative signal as one input thereto.

The positive signal on line 74 also causes OR circuit 112 to provide a positive level on line 113, produces a positive which turns trigger 115 on via line 114 to provide a positive output on line 116 and turns single shot 152 on. Oscillator 53 then steps counter rings 52 through a count of 1 through 80 conditioning in turn each columnar AND circuit in scanner 58. As each of the latter AND circuits is conditioned, positive outputs appear in succession at OR circuit 147 of detector 75 to maintain a positive signal level on line 155. The positive level serves as an input to INVERTER circuit 156 where a negative signal is produced on line 157 as one of three inputs to AND circuit 158.

The second conditioning input to AND circuit 158 on line 160 is provided by the emitter signal from line 74 after a delay through DELAY circuit 159. Circuit 159 is to insure that AND circuit 158 is not conditioned before the column 1 AND circuit 141 is conditioned by trigger stages U1 and T1. Otherwise, an error may occur at column 80 since the counter rings were sitting at that position before the first oscillator pulse of the light scan appeared at the counter rings. The third input to AND circuit 158 is supplied on line 151 from single shot 152.

Thus, with lines 160 and 151 positive and line 157 negative during proper cell operation, AND circuit 158 will not provide a positive output. However, if a cell or transistor is unable to accommodate the increased current flow during the scan, its output signal at junction 89 will be negative and one of the AND circuits of scanner 58 will not be conditioned. For example, if the transistor of column 11 is conducting, the negative signal on line 161 will prevent AND circuit 148 from providing a positive signal to OR circuit 147 (see waveforms N and Q). The resulting lack of a positive output from the OR circuit on line 155 permits the INVERTER output on line 157 to go positive and fully condition AND circuit 158. This results in a positive input to set LATCH circuit 163 via line 162. The LATCH output on line 164 is used to operate an indicating lamp or a relay 165 which may be used to stop further feeding of cards by de-energizing electromagnet 21 (FIG. 1) for example, by opening contact points in the circuit to the electromagnet. Latch 165 may be reset by applying a positive input to its reset terminal; this can be done by closing switch 166 which is connected to a source of positive potential.

Although the positive output from OR circuit 147 is also applied to AND circuit 167, this circuit is not conditioned from line 77 during the light scan. Hence, the input has no effect on that AND circuit.

Consider now the operation of the marginal checking apparatus during a dark scan when all cells are covered by the blank card margin 40 (FIG. 1). During this scan, line 74 is no longer energized but instead, after card 10 has moved sufficiently, line 77 is made positive from emitter segment 71 and brush 73. Variable voltage source 56 provides a decreased output voltage on line 92 because transistor 96 is brought into conduction. With the cells covered, their impedance is high and no potential is generated across their output terminals, causing transistors 82 to each conduct. Each sensing circuit should still properly operate with the reduced current available. The output signal from the respective junctions 89 is negative and blocks each AND circuit of scanner 58 so that only negative signals are fed to OR circuit 147 as each scanner AND circuit is conditioned successively by counter rings 52. Thus, a negative level signal in maintained on line 155 to INVERTER 156 and a positive level signal to AND circuit 158 which is blocked by the de-energized lines 74 and 160. However, the negative signal also appears at AND circuit 167 on line 155. This negative signal blocks AND circuit 167 which is partially conditioned by the positive signal on lines 77 and 169, delayed through DELAY circuit 168 which serves the same function as DELAY circuit 159 described above. Because the signals applied to one input of AND circuit 167 are negative, no further action results.

However, when one of the columnar cell-transistor sensing circuits malfunctions because of excessive cell leakage or insufficient transistor base-collector current gain, the signal at a junction 89 will provide a positive signal to one of the scanner AND circuits. For example, if the cell at column 2 should fail (waveform L) a positive output would be evident on line 170 to fully condition the column 2 AND circuit 171 of scanner 58. The resulting positive input to OR circuit 147 produces a positive output pulse on line 155 (waveform Q) and fully conditions AND circuit 167 (waveform S). A positive output on line 172 sets LATCH 173 (waveform U) so that its output on line 174 operates a lamp or relay 175 to stop card feeding in a manner similar to that described above. Upon correction of the defective sensing circuit, LATCH 173 is reset by applying a positive voltage to its reset input via switch 176.

The foregoing marginal checking circuit has been described as primarily used to determine the malfunction of photocells and transistors, but the circuit also detects card misfeeding and translucent cards. Since all cells are exposed during the light scan and covered during the dark scan, cards fed either too early or too late will cause false signals from the sensing circuits even though all cell-transistor circuits function properly. Also, when a card is unusually thin or, for instance, has oil impregnated areas, sufficient light passes through the card to produce false signals during a dark scan. These possible causes of error must be considered each time a false signal is indicated.

It may have been noted during the foregoing description of the counter rings that no provision was made at the start of operation to insure that all triggers were in the off state, except riggers U0 and T8 which are in the on state. Ordinarily when a trigger is first energized it may or may not be in the off condition and reset circuits must be provided to insure the desired state of conduction. These reset circuits have not been shown in order to simplify the drawings. The addition of such reset circuits is considered to be within the ability of one skilled in the art and therefore, not necessary in this description.

No specific description has been given of the data sensing operation for actually reading card perforations. This operation is believed to be readily apparent to one skilled in the art from the foregoing description of the marginal checking circuits. For example, in FIG. 3, brush 48 may be connected to OR circuit 112, shown by a broken line. This line would also be used to condition a utilization device (not shown). The output from each columnar AND circuit would then be sent to the utilization device serially condition for the receipt of data by the counter rings.

Although the marginal checking apparatus has been described in conjunction with a photo-responsive system for reading perforated cards, it is equally adapted to checking a photo-responsive system for sensing printed marks on cards. This latter system is shown schematically in FIG. 5, in which a card 180 has marks 181 printed thereon to represent data. As the card passes under light source 183, light is directed to the card surface from source 183 and reflector 182 then reflected from the card surface to photocell 184. A plurality of cells are provided, each shielded to be responsive only to the reflected light from a designated area of the card surface. Normally the card surfaces are of light color and reflect sufficient light causing the cell to maintain its amplifier off. When a mark 181 is printed on the light colored card surface with dark ink and passes through the sensed area, the reflected light is reduced causing the transistor to conduct. This action is opposite to that for the punched holes where a hole causes a transistor to be cut off. In this system, the marginal checking apparatus is modified to provide a reversal of simulated scans. That is, a dark scan is made before the card reaches light source 183 and then a light scan is made when the blank card margin 185 is positioned to reflect light onto cells 184.

It is to be understood that various other modifications can be made in the foregoing marginal checking apparatus. These modifications include utilizing only a single check of the sensing circuits during a card cycle instead of the two checking scans described. The single scan may be either a light or dark scan. Another obvious modification is that of providing individual indicating lamps or signal devices to specifically indicate which columnar sensing circuit has failed to meet the test applied. A method of accomplishing this is to use the counter ring pulses to also successively condition each individual signal device so that when either output LATCH 163 or 173 is set, its output will operate only a specific one of the series of signal devices.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a machine having an electrical date sensing circuit operable to indicate data manifestations and to which are presented successively in sensing relation record members having data manifestations recorded thereon at selected ones of particular data positions, marginal checking apparatus comprising:
(a) means for simulating the presence and absence of said data manifestations for said sensing circuit at least once for each said member presented in sensing relation thereto; and
(b) means controlled by said simulating means for modifying said sensing circuit during said simulation to induce failure of said sensing circuit when of marginal capability.

2. In a machine for processing record members bearing data manifestations at selected ones of designated data positions, marginal checking apparatus comprising, in combination:
(a) sensing means activatable for sensing predetermined ones of said designated positions and producing a first signal in response to the presence of said manifestations and producing a second signal in response to the absence of said manifestations;
(b) transport means for moving said members successively adjacent said sensing means along a fixed path;
(c) means synchronized with said transport means and operable at predetermined positions reached by said members in said path for activating said sensing means to simulate the presence and absence of said manifestations; and
(d) means controlled by said synchronized means for inducing said sensing means to provide a false second signal during said simulated presence of said manifestations and to provide a false first signal during said simulated absence of said manifestations.

3. In a machine for processing record members bearing data manifestations at selected ones of designated data positions, marginal checking apparatus comprising, in combination:
(a) a plurality of sensing means each activatable for sensing predetermined ones of said positions and producing first signals in response to the presence of said manifestations and producing second signals in response to the absence of said manifestations;
(b) transport means for moving said members successively along a path adjacent each of said plurality of sensing means;
(c) means synchronized with said transport means and operable at predetermined positions of said members in said path for activating said plurality of sensing means to simulate the presence and absence of said manifestations; and
(d) means controlled by said synchronized means with said transport means for inducing each said sensing means to provide false said second signals during said simulated presence of said manifestations and to provide false first signals during said simulated absence of said manifestations.

4. Apparatus as described in claim 3 further comprising means operated by said synchronized means for detecting the occurrence of each said false first and second signals.

5. Apparatus as described in claim 4 further comprising means connected to said detection means for providing an indication of the occurrence of said false signals.

6. In a machine for processing record members having data indicia recorded thereon in selected ones of designated data positions, marginal checking apparatus comprising, in combination:
(a) a record sensing station including a plurality of electrical means each adapted to sense particular ones of said designated data positions under predetermined circuit conditions and provide output signals in accordance with the presence or absence of said data indicia;

(b) transport means for successively moving said members in sensing relation to said station; and
(c) means connected to each of said electrical means and synchronized with said transport means for modifying said predetermined circuit conditions to induce each said electrical means of marginal capability to provide false output signals.

7. Apparatus as described in claim 6 further comprising detection means associated with each of said electrical means for detecting any of said false output signals.

8. In a machine for processing record members having data indicia recorded thereon in selected ones of designated data positions, marginal checking apparatus comprising, in combination:
(a) a record sensing station including a plurality of electrical means, each sensing particular ones of said designated data positions under predetermined circuit parameters for providing a first signal when an indicium is present and a second signal when an indicium is absent in each of said sensed positions;
(b) transport means for successively moving said members in sensing relation with said station;
(c) means connected to each of said sensing means and synchronized with said transport means for regularly modifying said predetermined circuit parameters in a manner to induce each said electrical means of marginal capability to provide false first and second signals; and
(d) detection means associated with each of said sensing means for detecting any of said false signals.

9. In a machine for processing record members having data manifestations recorded thereon in selected ones of designated data positions, marginal checking apparatus comprising, in combination:
(a) an energizable electrical sensing circuit operable under predetermined voltage conditions for scanning said members and providing an output signal when one of said data manifestations is present;
(b) transport means for moving one of said members along a path in scanning relation with said sensing circuit;
(c) means synchronized with said transport means for energizing said circuit when said member is at a predetermined position in said path to simulate the absence of a said data manifestation to said circuit; and
(d) circuit modifying means connected to said sensing circuit and said synchronized means for varying one of said voltage conditions during said simulated absence of said data to induce a said output signal from said sensing circuit when said sensing circuit is of marginal capability.

10. In a machine for processing record members having data manifestations recorded thereon in selected ones of designated data positions, marginal checking apparatus comprising, in combination:
(a) an electrical sensing circuit operable under predetermined voltage conditions for scanning said members and providing first or second output signals respectively indicative of the presence or absence of a data manifestation;
(b) means including transport means for moving one of said members into scanning relation with said sensing circuit and simulating successively the presence and absence of a said data manifestation to said sensing circuit; and
(c) circuit modifying means connected to said sensing circuit and said transport means for varying one of said voltage conditions in a first direction and in a second direction corresponding to said simulation of the said presence and absence of a said data manifestation to induce false output signals opposite from those intended only when said sensing circuit is of marginal capability.

11. In a machine for processing record members having data manifestations recorded thereon at selected ones of designated data positions of said member, marginal checking apparatus comprising, in combination:

(a) a sensing station including a plurality of electrical circuits, each said circuit being operated under predetermined circuit parameters for sensing a portion of said member to provide first or second output signals when said manifestations are respectively present or absent in said data positions of said scanned portions;

(b) means including transport means for successively moving said members through said station to simulate the presence or absence of data manifestations for each said circuit and to present said member portions for sensing;

(c) circuit modifying means connected to each said electrical circuit and synchronized with said transport means for changing said predetermined circuit parameters during said simulation portion of said record movement to induce ones of said electrical circuits of marginal capability to produce false first or second output signals; and (d) detection means operatively associated with each of said electrical circuits to detect the occurrence of a false signal.

12. In a machine for processing record members having data manifestations recorded thereon in selected ones of designated data positions of a particular record area, marginal checking apparatus comprising, in combination:

(a) a record sensing station including a plurality of energizable electrical circuits each adapted to sense particular data positions of said member under predetermined circuit parameters and provide a first output signal when one of said data manifestations is present and a second output signal when said manifestations is absent in said position sensed;

(b) cyclically operable energizing means for said circuits including transport means for moving each said record member in succession toward said station and sequentially simulating the presence and absence of a said data manifestation for each said electrical circuit before said particular positions are sensed;

(c) circuit modifying means connected to each said electrical circuit and synchronized with said transport means for cyclically varying said circuit parameters of each said circuit during each said simulated presence to induce those said circuits of marginal capability to provide erroneous said second output signals, and for cyclically varying said circuit parameters of each said circuit during each said simulated absence to induce those said circuits of marginal capability to provide erroneous said first output signals; and (d) means operatively connected with each said sensing circuit for detecting the occurrence of said erroneous first or second output signals.

13. In a machine for processing record members having data perforations in selected ones of designated positions thereon and a nonperforated portion, marginal checking apparatus comprising, in combination:

(a) a sensing station for said perforations including a light source, a switching circuit having first and second conducting states, a photo-responsive device connected to said switching circuit for driving said switching circuit into said second state when exposed and into said first state when not exposed to light from said source, a variable voltage source connected to said device and said switching circuit for providing a normal supply voltage;

(b) cyclic transport means for successively moving said members along a fixed path to said sensing station between said source and said device;

(c) first control means connected to said variable voltage source and said transport means for cyclically altering said variable source to provide a first deviation from said normal voltage prior to the arrival of each said member between said light source and said device to falsely induce said switching circuit into said first state when said switching circuit and said device are of marginal capability; and (d) second control means connected to said variable voltage source and said transport means for cyclically altering said variable source to provide a second deviation of said normal voltage when said nonperforated portion of said members is between said light source and said device to falsely induce said switching circuit into said second state when said switching circuit and said device are of marginal capability.

14. Apparatus as described in claim 13 further comprising:

(a) means connected to said switching circuit for detecting any of said falsely induced conducting states; and (b) means associated with said detection means for providing an indication of any falsely induced conducting states detected by said detection means.

15. In a machine for photo-electrically processing record members having data perforations in selected ones of designated positions and a nonperforated nondata portion, marginal checking apparatus comprising, in combination:

(a) a station for sensing said perforations including a light source, a plurality of switching circuits each having first and second conducting states, a photo-responsive device connected to each switching circuit for driving its respective switching circuit into said second state when exposed and into its said first state when not exposed to light from said source, a variable voltage source connected to each said device and its said switching circuit for providing a predetermined supply voltage;

(b) cyclic transport means for successively moving said members along a fixed path to said sensing station between said light source and said devices;

(c) first control means connected to said variable voltage source and synchronized with said transport means for cyclically altering said variable source to provide a first deviation from said predetermined voltage prior to the arrival of each said member between said light source and said devices to falsely induce said respective switching circuits into said first state when any of said switching circuits and said devices are of marginal capability; and (d) second control means connected to said variable voltage source and synchronized with said transport means for cyclically altering said variable source to provide a second deviation of said supply voltage from said predetermined voltage when said nonperforated portion of said members is between said light source and said devices to falsely induce respective ones of said switching circuits into their second states when the switching circuits and said devices are of marginal capability.

16. Apparatus as described in claim 14 further comprising a detection means including an electrical ring circuit for serially sampling each said switching circuit and detecting any of said falsely induced conducting states.

References Cited by the Examiner

UNITED STATES PATENTS 2,687,253 8/1954 McMillan ---------- 235—61.11

MALCOLM A. MORRISON, *Primary Examiner.*

DARYL W. COOK, *Examiner.*